United States Patent
Stanacevic et al.

(10) Patent No.: US 11,763,106 B2
(45) Date of Patent: Sep. 19, 2023

(54) METHOD FOR PASSIVE WIRELESS CHANNEL ESTIMATION IN RADIO FREQUENCY NETWORK AND APPARATUS FOR SAME

(71) Applicant: The Research Foundation for The State University of New York, Albany, NY (US)

(72) Inventors: Milutin Stanacevic, Smithtown, NY (US); Samir Das, Melville, NY (US); Petar Djurić, Setauket, NY (US); Athalye Akshay, Forest Hills, NY (US); Ryoo Jihoon, Incheon (KR); Yasha Karimi, Selden, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 255 days.

(21) Appl. No.: 16/972,829

(22) PCT Filed: Jun. 5, 2019

(86) PCT No.: PCT/US2019/035542
§ 371 (c)(1),
(2) Date: Dec. 7, 2020

(87) PCT Pub. No.: WO2019/236679
PCT Pub. Date: Dec. 12, 2019

(65) Prior Publication Data
US 2021/0248335 A1    Aug. 12, 2021

Related U.S. Application Data (60) Provisional application No. 62/680,813, filed on Jun. 5, 2018.

(51) Int. Cl.
*G06K 7/10* (2006.01)
*G06K 19/07* (2006.01)
*G06K 19/077* (2006.01)

(52) U.S. Cl.
CPC ..... *G06K 7/10366* (2013.01); *G06K 19/0723* (2013.01); *G06K 19/07773* (2013.01)

(58) Field of Classification Search
CPC .................................................. G06K 7/10366
See application file for complete search history.

(56) References Cited

U.S. PATENT DOCUMENTS 7,089,014 B2    8/2006    Brown et al.
7,692,532 B2    4/2010    Fischer
(Continued)

FOREIGN PATENT DOCUMENTS

CA    3006906    12/2018
CN    109547039    3/2019
(Continued)

OTHER PUBLICATIONS

PCT/ISA/237 Written Opinion issued on PCT/US2019/035542, dated Oct. 1, 2019, pp. 5.
PCT/ISA/210 Search Report issued on PCT/US2019/035542, dated Oct. 1, 2019, pp. 3.
P. V. Nikitin, S. Ramamurthy, R. Martinez, and K. Rao, "Passive tag-to-tag communication," in RFID (RFID), 2012 IEEE International Conference on. IEEE, pp. 177-184, 2012.
(Continued)

*Primary Examiner* — Nabil H Syed
*Assistant Examiner* — Cal J Eustaquio
(74) *Attorney, Agent, or Firm* — The Farrell Law Firm, P.C.; Douglas M. Owens, III (57) ABSTRACT

A method, system and apparatus are provided for estimating characteristics of a wireless communication channel between at least two passive radio frequency (RF) nodes. Backscatter channel state information (BCSI) is measured during communication between the at least two passive RF nodes using the wireless communication channel. An RF node aggregates the measured BCSI and the aggregated
(Continued)

— — Tag to tag backscatter
— - — Signals reflected from objects and humans

BSCI is analyzed to detect at least one activity of a plurality of activities.

20 Claims, 6 Drawing Sheets

(56) References Cited

U.S. PATENT DOCUMENTS

| | | |
|---|---|---|
| 10,498,569 B2 | 12/2019 | Ganesan et al. |
| 10,701,662 B2 | 6/2020 | Luo et al. |
| 11,126,905 B2 | 9/2021 | Zajic et al. |
| 11,483,836 B2 | 10/2022 | Zhang et al. |
| 11,500,056 B2 | 11/2022 | Wu et al. |
| 2007/0279225 A1 | 12/2007 | Pelleraano et al. |
| 2008/0174410 A1 | 7/2008 | Sarangapani et al. |
| 2012/0105210 A1 | 5/2012 | Smith et al. |
| 2017/0032154 A1 | 2/2017 | Otis et al. |
| 2017/0212210 A1 | 7/2017 | Chen et al. |
| 2017/0286730 A1 | 10/2017 | Sadr |
| 2018/0032768 A1 | 2/2018 | Ganesan et al. |
| 2018/0275246 A1 | 9/2018 | Ma et al. |
| 2022/0120893 A1 | 4/2022 | Lee et al. |

FOREIGN PATENT DOCUMENTS

| | | |
|---|---|---|
| CN | 109995413 | 7/2019 |
| DE | 112005001761 | 5/2007 |
| EP | 2483832 | 8/2012 |
| EP | 2795847 | 10/2014 |
| EP | 3389190 | 10/2018 |
| EP | 3532981 | 9/2019 |
| GB | 2535298 | 8/2016 |
| KR | 2015013339 | 11/2015 |
| KR | 101668559 | 10/2016 |
| KR | 20190025157 | 3/2019 |
| KR | 102029930 | 10/2019 |
| WO | WO 2011035256 | 3/2011 |
| WO | WO 2016011433 | 1/2016 |
| WO | WO 2016187254 | 11/2016 |
| WO | WO2017146365 | 8/2017 |
| WO | WO2018106852 | 6/2018 |
| WO | WO 2019232420 | 12/2019 |

OTHER PUBLICATIONS

Y. Karimi, A. Athalye, S. R. Das, P. M. Djuric, and M. Stanacevic, "Design of a backscatter-based tag-to-tag system," in RFID (RFID), . . . 2017 IEEE International Conference. IEEE, pp. 6-12, 2017.

L. Shangguan et al., "ShopMiner: Mining Customer Shopping Behavior in Physical Clothing Stores with COTS RFID Devices", SenSys'15, Nov. 1-4, 2015, . . . Seoul, South Korea, pp. 113-126.

R. Parada et al., "Using RFID to Detect Interactions in Ambient Assisted Living Environments", © 2015 IEEE IEEE Intelligent Systems Published by the IEEE Computer Society, . . . pp. 16-22.

H. Ding et al., "Device-free Detection of Approach and Departure Behaviors using Backscatter Communication", UBICOMP '16, Sep. 12-16, 2016, Heidelberg, Germany, . . . pp. 167-177.

X. Huang et al., "Indoor Device-Free Activity Recognition Based on Radio Signal", IEEE Transactions on Vehicular Technology, vol. 66, No. 6, Jun. 2017, pp. 5316-5329.

B. Alsinglawi et al., "Passive RFID Localisation Framework in Smart Homes Healthcare Settings", The Promise of New Technologies in an Age of New Health Challenges . . . A. J. Maeder et al. (Eds.) © 2016 The authors and IOS Press, pp. 1-8.

A. Jayatilaka et al., "Real-time fluid intake gesture recognition based on batteryless UHF RFID technology", Pervasive and Mobile Computing 34 (2017) 146-156.

L. Gortschacher et al., "SDR Based RFID Reader for Passive Tag Localization Using Phase Difference of Arrival Techniques", . . . 2016 IEEE MTT-S International Microwave Symposium (IMS), San Francisco, CA, 2016, pp. 1-4.

Y. Dong et al., "A Novel Hybrid Powered RFID Sensor Tag", 2015 IEEE International Conference on RFID (RFID), pp. 55-62.

F. Iannello et al., "Energy Management Policies for Passive RFID Sensors with RF-Energy Harvesting", 2010 IEEE International Conference on Communications, Cape Town, 2010, . . . pp. 1-6.

Y. Zou et al., "GRfid: A Device-Free RFID-Based Gesture Recognition System", IEEE Transactions on Mobile Computing, vol. 16, No. 2, Feb. 2017, pp. 381-393.

Ryoo, Jihoon et al., "Barnet: Towards Activity Recognition Using Passive Backscattering Tag-to-Tag Network", 2018 In Proceedings of the 16th Annual International Conference on Mobile Systems, Applications, and Services (MobiSys '18). Association for Computing Machinery, New York, NY, USA.

METHOD FOR PASSIVE WIRELESS CHANNEL ESTIMATION IN RADIO FREQUENCY NETWORK AND APPARATUS FOR SAME

PRIORITY

This application claims the benefit of U.S. Provisional Application No. 62/680,813 filed with the U.S. Patent and Trademark Office on Jun. 5, 2018, the entire content of which is incorporated herein by reference.

GOVERNMENT SUPPORT

This invention was made with government support under grant numbers CNS-1405740 and CNS-1763843, each awarded by the National Science Foundation. The government has certain rights in the invention.

BACKGROUND OF THE INVENTION

1. Field

The present invention relates generally to wireless communications between passive Radio Frequency (RF) devices.

2. Related Art

RFID (Radio Frequency IDentification) tags are generally classified as being an active tag or a passive tag. Active RFID tags have an actively powered transceiver. Passive RFID tags are powered by harvested ambient energy.

Passive tag-to-tag communication is a relatively new technology [1, 4]. Electromagnetic models for such communication were addressed in [5], and there have been various efforts to advance this technology. One effort is presented in [1], where commercial TV signals were exploited for excitation, and where communication ranges of a fraction of a meter were reported. In an effort to extend the range of the tag-to-tag link, CDMA encoding has been proposed [3]. Another approach to increase the communication range in tag-to-tag networks was to build customized multi-hop network architectures and routing protocols [6].

Efforts to improve hardware for tags of tag-to-tag networks is on-going [7, 8], as is tracking of events with such networks [9]. The possibility of using a network as a device-free activity recognition system has been explored [10], because tags for communication exploit multiphase probing, which amounts to reflecting incident RF signals during backscattering with different phases of the reflected signal.

The backscattering communication principle until recently has been mostly limited to RFID systems [11, 12, 13, 14, 15] with a standard RFID system including an RFID reader, a computationally powerful device with active radio and an ability to cancel the emitting RF signal from the signal being received by the reader. For tag-to-reader communication, the tag simply modulates its antenna reflection coefficient by switching between two impedances that terminate the tag antenna circuit [11], which effectively modulates the reflected signal back to the reader. The active reader demodulates this signal by employing IQ demodulation and active cancellation of the interfering carrier signal. However, the large scale applications of RFID systems have been mostly limited by the infrastructure cost of RFID reader deployment.

However, drawbacks of conventional systems and methods include high infrastructure cost and high energy cost of active radios for wireless channel estimation.

SUMMARY

To overcome shortcomings of conventional methods, components and systems, provided herein are methods, systems and an apparatus for estimating characteristics of a wireless communication channel between at least two passive RF nodes, as well as the advantages described herein.

An aspect of the present disclosure provides a method for estimating characteristics of a wireless communication channel between at least two passive backscattering radio frequency (RF) nodes, with the method including measuring backscatter channel state information (BCSI) during communication between the at least two passive RF nodes using a multi-phase probing (MPP) signal; aggregating, by at least one RF node of the at least two passive RF nodes, the measured BCSI; and analyzing, by the at least one RF node, the aggregated BSCI at least one of detect at least one activity of a plurality of activities, improve a rate of data communication, improve robustness, and reduce bit error rate.

Another aspect of the present disclosure provides a passive radio frequency (RF) node that includes a backscatter modulator and at least one processor configured to measure backscatter channel state information (BCSI) during communication with at least one other passive RF node, aggregate the measured BCSI, and analyze the aggregated BSCI to at least one of detect at least one activity of a plurality of activities, improve a rate of data communication, improve robustness, and reduce bit error rate.

BRIEF DESCRIPTION OF THE DRAWINGS

The above and other aspects, features and advantages of certain embodiments of the present invention will be more apparent from the following detailed description taken in conjunction with the accompanying drawings, in which.

DETAILED DESCRIPTION

The following detailed description of certain embodiments references the accompanying drawings. In the description, explanation about related functions or constructions known in the art are omitted for clarity.

Figure 1:
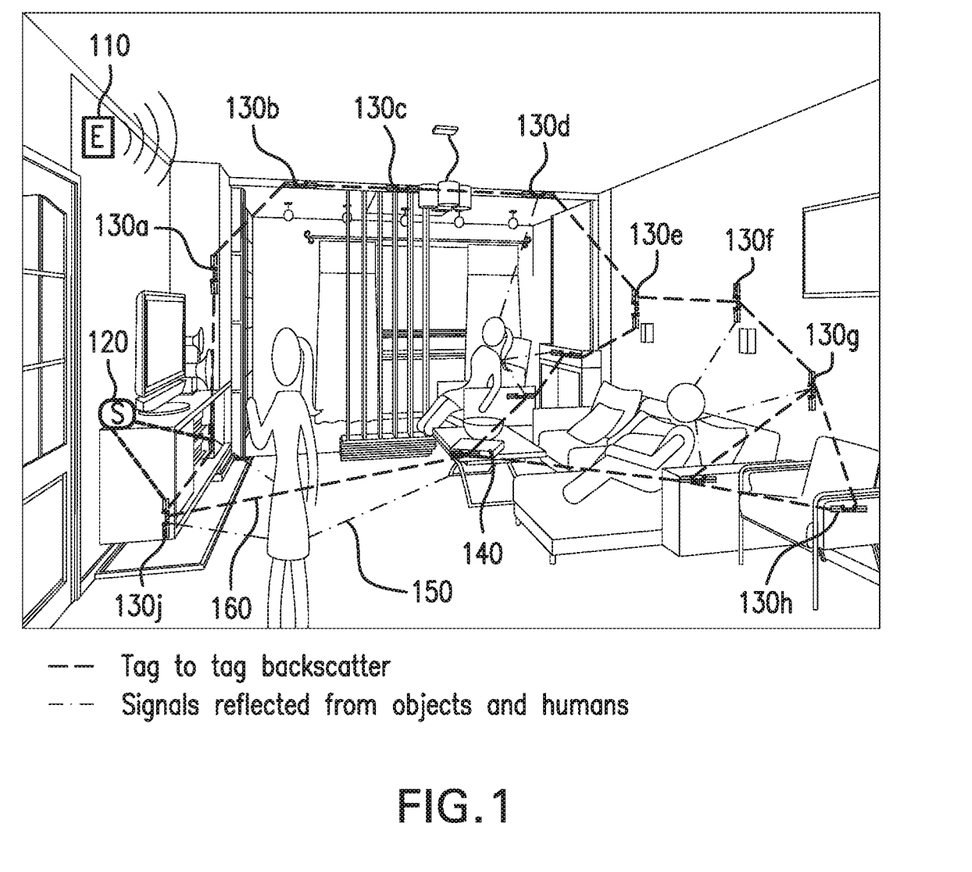
FIG. 1 illustrates a network of a plurality of passive tags in a living space in accordance with an embodiment of the present disclosure.

FIG. 1 illustrates a network comprising a plurality of passive RFID tags in a living space. The plurality of passive RFID tags communicate with each other without the presence of an external RFID reader.

The plurality of passive RFID tags 130a-130j tags communicate with each other directly in response to an RF signal, e.g. signal output from excitation source 110, in the network environment to support backscattering. The plurality of passive RFID tags either use local RF exciters or ambient RF signals for back-scattering. The sink 120 serves to upload information captured by the network to the cloud.

The plurality of passive RFID tags 130a-130j form the network by tag-to-tag backscatter 160. Multiphase probing of tag-to-tag channel is performed within an area of the network. The plurality of passive RFID tags exploit multiphase probing to provide rich RF analytics about the environment in the network in which the plurality of passive RFID tags 130a-130j operate. As described herein, the analytics identify at least one invariant with regard to a number of variables, including the deployment environment, human subjects, location within the deployment environment, and different deployment locations.

Enabling tag-to-tag communication based on the backscattering principle eliminates the need for RFID reader in the system. The added complexity in the RF tag capable of the tag-to-tag communication lies on the receiving side. According to the present disclosure, the receiving (Rx) tag resolves a low modulation index signal reflected by the transmitting (Tx) tag. A conventional RFID tag is able to resolve a signal from a transmitting RFID tag only on a distance that is a fraction of a meter [4, 5]. With integrated signal amplification after envelope detection on the RF tag, the range of tag-to-tag link is extended to a few meters [7, 3]. RF tags then form a network transforming a conventional centralized system with an RFID reader to a distributed system. The tag-to-tag network only requires the presence of an RF signal in the environment. The RF signal can be either an ambient signal from WiFi APs or TV towers, or can originate from a dedicated exciter device that emits continuous wave (CW) signal with zero intelligence.

The multiphase probing of present disclosure explores a backscatter channel by reflecting an incident RF signal with different changes in the phase and defining a measure of the backscatter channel, i.e., backscatter channel state information (BCSI) to enable the system formed by the plurality of passive RFID tags to recognize activities. The BCSI is composed of backscatter channel phase, backscatter amplitude, and change in baseline excitation level. When acquired over time, this measure provides rich RF analytics that are used to extract various types of information from the environment of the tags by at least one of a method of signal processing and a method of machine learning.

Techniques that are mostly used for activity recognition of a person that does not carry or wear any device, i.e., device-free, rely on analysis of wireless channels that ingrain information on reflections from a person and other living beings and objects in the environment [16, 17, 18]. Passive RF tags cannot perform IQ demodulation in order to estimate tag-to-tag channels due to their limited power budgets. Tags have to rely on passive envelope demodulation that only obtains the amplitude of the received signal.

Figure 2:
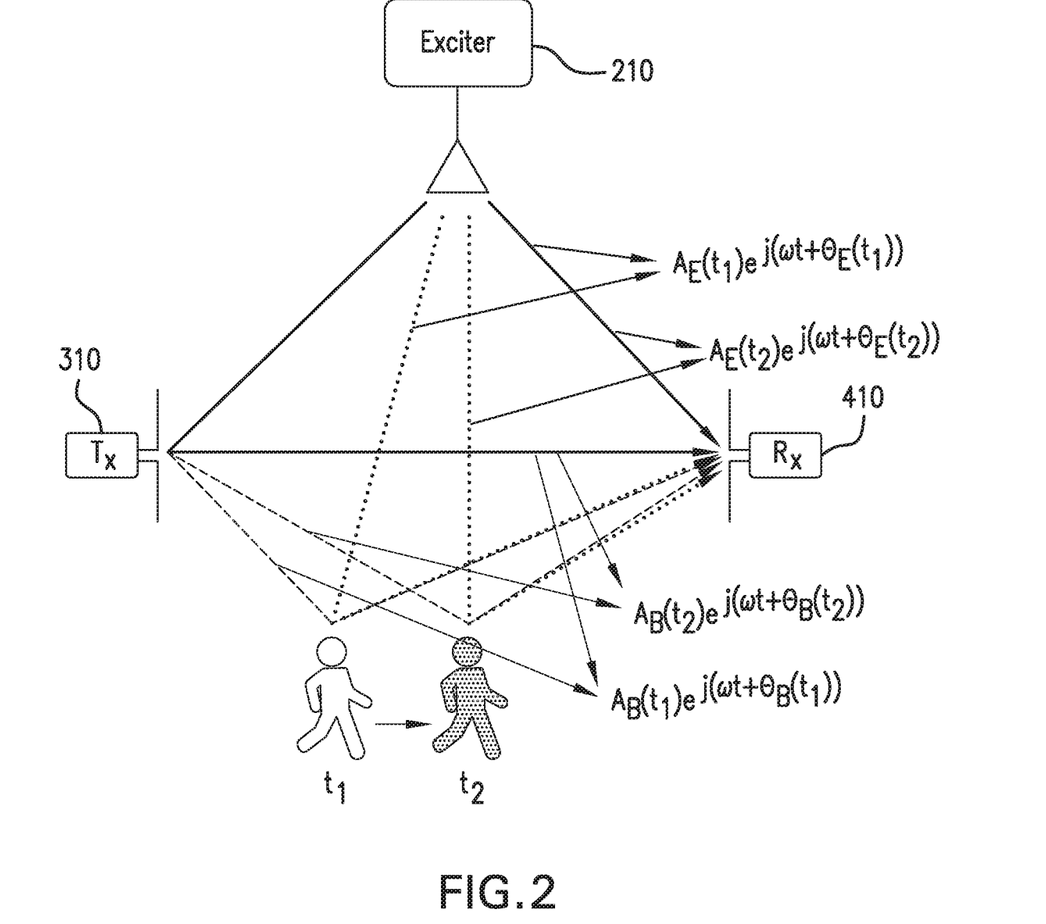
FIG. 2 illustrates direct and reflected signals in a backscattering tag-to-tag link scenario with a person located in the vicinity of the tags in accordance with an embodiment of the present disclosure.

The present disclosure provides method, apparatus and system to estimate tag-to-tag channel characteristics. FIG. 2 illustrates direct and reflected signals in a backscattering tag-to-tag link scenario with a person located in the vicinity of the tags. In the present disclosure, the passive tags for which tag-to-tag channel characteristics are estimated are mounted to objects.

As shown in FIG. 2, a dedicated exciter 210 is provided with a transmitting (Tx) tag 310 and a receiving (Rx) tag 410. For simplicity of illustrating the derivation, the Tx tag 310 switches between two states, open circuit and reflection with phase $\phi$.

First, when an antenna circuit of the Tx tag 310 is open, the Rx tag 410 only receives the signal from the exciter 210, according to Equation (1):

$$v_{R1}(t)=A_E(t)e^{j(\omega t+\theta_E(t))}, \qquad (1)$$

where via is the signal received at the Rx tag 410 in state 1, $A_E$ is the amplitude of the exciter-Rx channel, and $\Theta_E$ is the phase of the exciter-Rx channel. The amplitude $A_E$ and phase $\Theta_E$ of the exciter-Rx channel are dependent on the reflections from the environment.

The impedance of the antenna circuit is then changed, such that the Tx tag 310 reflects an incident RF signal with a phase $\phi$. The signal received at the Rx tag 410 combines the reflected signal from the Tx tag 310 and the direct path signal from exciter according to Equation (2):

$$v_{R2}(t)=A_E(t)e^{j(\omega t+\theta_E(t))}+A_B(t)e^{j(\omega t+\theta_B(t)+\phi)}, \qquad (2)$$

where $A_B$ is the amplitude of the backscatter and $\Theta_B$ is the phase of the exciter-Tx-Rx channel. The baseband signal obtained at the Rx tag 410 is the difference between the output of the envelope detector in the two states.

When the amplitude of the backscatter signal $A_B$ is much smaller than the amplitude of the excitation signal $A_E$, the difference between the two amplitudes simplifies to Equation (3):

$$\Delta v_R(t) = v_{R2}^{amp}(t) - v_{R1}^{amp}(t) \qquad (3)$$
$$\approx A_B \cos(\phi + \theta_B(t) - \theta_E(t)).$$

The backscatter channel phase is $\Theta_{BC}(t)=\Theta_B(t)-\Theta_E(t)$.

To estimate the backscatter tag-to-tag channel, an estimation of the amplitude and phase $A_B$ and $\Theta_{BC}(t)$ is performed. As the tags cannot directly measure these channel parameters, the channel parameters are exploited in Equation (4):

$$\Delta v_R = A_B \cos(\phi+\theta_{BC}), \qquad (4)$$

the phase $\phi$ is deterministic and is set by the Tx tag.

If the modulator of the Tx tag 310 varies the phase $\phi$, the amplitude and phase of the backscatter signal is obtained using Equation (5):

$$\theta_{BC} = \frac{\pi}{2} - \phi|_{\Delta v_R=0}, \qquad (5)$$
$$A_B = \Delta v_R|_{\phi=-\theta_{BC}}.$$

The modulator of the Tx tag operates in a plurality of states, with a set of discrete phases $\phi_1, \phi_2, \ldots, \phi_N$, where N is the number of total states at which the modulator of the Tx tag backscatters. The discrete reflection phases $\phi_1$ to $\phi_N$ are chosen to uniformly cover the range from 0 to $\pi$. The phase $\Theta_{BC}$ is estimated based on the value of $\phi$ that results in $\Delta v_R$ being equal to zero. With a discrete number of states, $\Theta_{BC}$ is estimated from a weighted interpolation of two phases adjacent to zero-crossing of $\Delta v_R$. The amplitude $A_B$ is obtained by weighted interpolation of $\Delta v_R^k$ between the same two phases, and the coefficients of this interpolation will be the same as those used in the estimation of $\Theta_{BC}$. The number of phases N depends on the required resolution of the estimation of $A_B$ and $\Theta_{BC}$, the signal-to-noise ratio (SNR) of the received baseband signal and the data rate of the tag-to-tag link.

For RF analytics, since the human body and other objects reflect wireless signals, any activity in the vicinity of the tags alters the wireless channels around them in specific ways. Hence, by using the collated channel measurements received from over the tag network, the system infers analytic information about the environment, including humans and objects occupying the environment. The analytic information about the environment can also detect changes in spacing between components of a structure, such as changes in stanchions of a bridge, etc.

The dynamics of the exciter-Rx channel are not measured using the above-described techniques since control of the phase of the signal emitted by the exciter is not directly controlled. Rather, recording the changes in the excitation level $A_E$ provides valuable supplementary information about this channel, and the backscatter channel state information (BCSI) is measured, based on the following three quantities: (1) backscatter channel phase $\Theta_{BC}$, (2) backscatter amplitude $A_B$, and (3) change in excitation amplitude between two sampling intervals $\Delta A_E$. The BCSI vector recorded for a specific activity in an environment will have similar signature to the same activity performed in a different environment, as well as activity performed by a different person.

The BCSI vector serves as a feature vector which forms the basis of activity recognition. Once activity is detected in the presence of at least two tags, the Tx tag enters a multi-phase probing (MPP) backscatter, in which, in a single MPP cycle, the backscatters has a discrete reflection phase $\phi_1$ to $\phi_N$. For each probing cycle, the Rx tag computes the BCSI vector for that cycle, h(t). During the activity, the BCSI vector is sampled, where the sampling rate is sufficiently higher than the frequency/speed of the activities. The determination of the sampling rate is also driven by the energy budget of the Rx tag which limits the backscatter data rate and the number of discrete reflection phases. The sampled BCSI vector carries the distinctive signature of a specific event and is then used for classification.

Invariance of RF analytics provides a basis for activity recognition. The BCSI measure is used for activity recognition with similar analytics since the performance of a system is agnostic to the environment within which the system is deployed. As set forth above, the BCSI vector contains the backscatter channel phase, backscatter channel amplitude, and the change in baseline excitation level. This vector is denoted by Equation (6):

$$h(t)=[\Theta_{BC} A_B \Delta A_E] \quad (6)$$

To perform activity recognition, the Tx tag sends out the MPP signal continuously for a predetermined number of cycles. For each cycle t, the Rx tag computes the BCSI vector h(t). These continuous BCSI samples are wirelessly conveyed and analyzed to detect movement in the network, and individual components of the BCSI are parsed for dynamic variation patterns. The dynamic variation patterns in each individual component jointly form an event signature which classifies the detected event. For example, the detected event can be movement of a person in the network, movement of a limb of the person in the network, movement of an object in the network, and movement of a wall or other structure defining a network boundary.

The passive tags that form the network can be affixed to multiple locations in the network. Detection of movement via BCSI analysis of a wall or other structure that defines a network boundary is used to identify unwanted structural changes, such as deflection of a wall, floor or ceiling in a building, or identification of movement of a supporting member, e.g., a bridge stanchion.

All analytics and event recognition are performed based on the dynamic variation patterns in the BCSI vector components, not absolute value thereof, thereby resulting in the invariance properties of the system that enhance robustness for use in practical situations. For example, invariance with regard to changes in the deployment environment, e.g., static objects and clutter, does not require retraining of the system. Also, invariance with regard to human subjects allows event recognition performance to remain unchanged for differences in physical size and shape of the subject compared to the subject used for training the system. Further, since a dense deployment of tags is used and tag-to-tag links are short range, the system can recognize events in all areas within the deployment zone given sufficient coverage of tags, thereby providing invariance with regard to location within the deployment environment. After system deployment and training, the system can be deployed in a same constellation. Despite being in a totally different environment, the system will perform identically without re-training.

Figure 3:
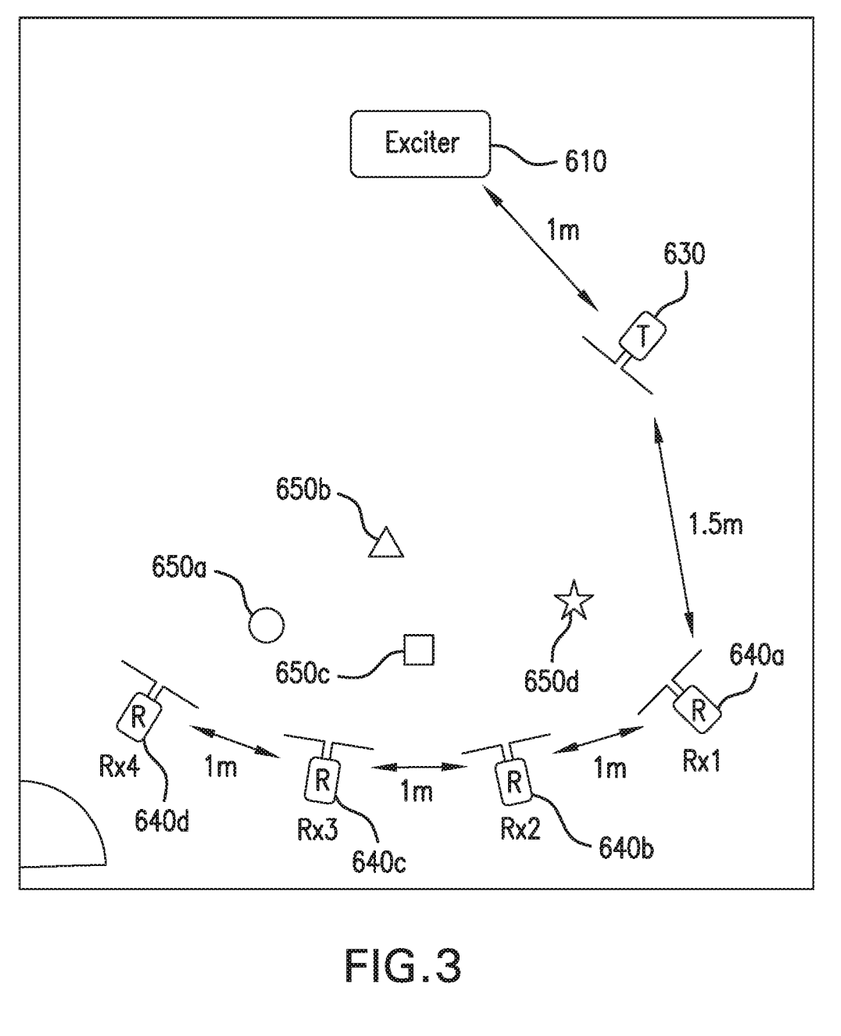
FIG. 3 illustrates an experimental system setup using passive RF tags for collection of the BCSI vector data for passive channel estimation and activity recognition in accordance with an embodiment of the present disclosure.

FIG. 3 illustrates an experimental system setup using a plurality passive RF tags, i.e., nodes 630, 640a, 640b, 640c and 640d, arranged in a room of nine square meters for collection of the BCSI vector data for passive channel estimation and activity recognition. As described above, the exciter 610 can be replaced by ambient energy.

Each passive RF tag 630, 640a, 640b, 640c and 640d includes a single dipole antenna on a separate printed circuit board (PCB) and uses discrete component architectures for modulator and demodulator implementation for tag-to-tag communication. The modulator design includes an RF switch which accommodates ten different reflection phases. The demodulator consists of a passive envelope detector followed by a low-pass filter. The control is implemented on a low-power microcontroller, e.g., Texas Instruments TI MSP430. For measurement of BCSI, the envelope detector output is connected to a PCB with high-resolution 16-bit 80 kbps ADC that enables data logging of the envelope signal and off-line computation of the BCSI vector. The exciter is implemented using a software radio BladeRF [19] and open source software [20]. The exciter emits a CW signal at 915 MHz. The BladeRF is connected to a 9 dBi circularly polarized antenna [21].

FIG. 3 illustrates specified locations 650a-d in the room surrounded by the passive RF tag 630, 640a, 640b, 640c and 640d. Training and testing samples were collected for nine participants that performed ten different daily activities in a lab setting. The activities were grouped into eight classes, i.e., brushing, falling, running, no activity (person is either sitting or standing still), sitting down from standing position, standing up from seating position, walking, and waving (either in sitting or standing position). The exciter power was set at 15 dBm and the transmitter with backscatter modulator of passive RF tag 630 transmitted at different ten phases. The sampling time of the collection of BCSI information was 50 ms and data was recorded for 2.5 seconds from the start of the activity. Each subject repeated each activity five times in each of the four specified locations 650a-d.

To estimate $A_B$ and $\Theta_{BC}$, each activity was captured in a duration of 2.5 seconds using fifty transmissions. For each transmission, observations were obtained of amplitudes for a set of fixed phases, from which a sinusoid function that is characterized by its phase and amplitude was estimated with standard signal processing techniques.

For invariance, each activity experiment was encoded by the dynamics of the BCSI vector. The encoded information not only captures signatures of different activities, but also is invariant with regard to. location, changes in deployment environment and human subject. To better visualize the similarities, a comparison of only the dynamics of $A_B$ is provided, since the similarities in the dynamics of $\Theta_{BC}$ and $\Delta A_E$ need re-scaling, reversing and shifting.

Figure 4:
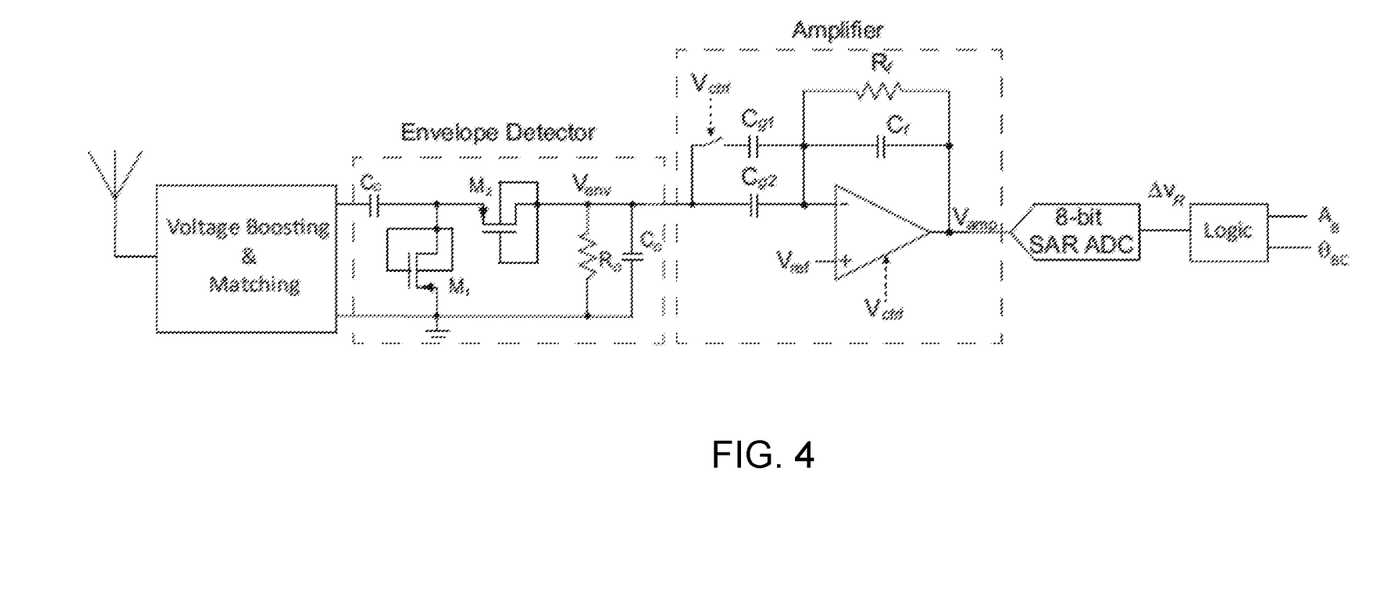
FIG. 4 is a circuit diagram of a passive tag-to-tag channel estimator in accordance with an embodiment of the present disclosure.

FIG. 4 is a circuit diagram of a passive tag-to-tag channel estimator in accordance with an embodiment of the present disclosure. As shown in FIG. 4, the channel estimator includes an antenna, a transmitter for voltage boosting that includes a backscatter modulator, matching and wireless communications, an envelope detector, an amplifier, the SAR ADC, and a logic circuit.

Figure 5:
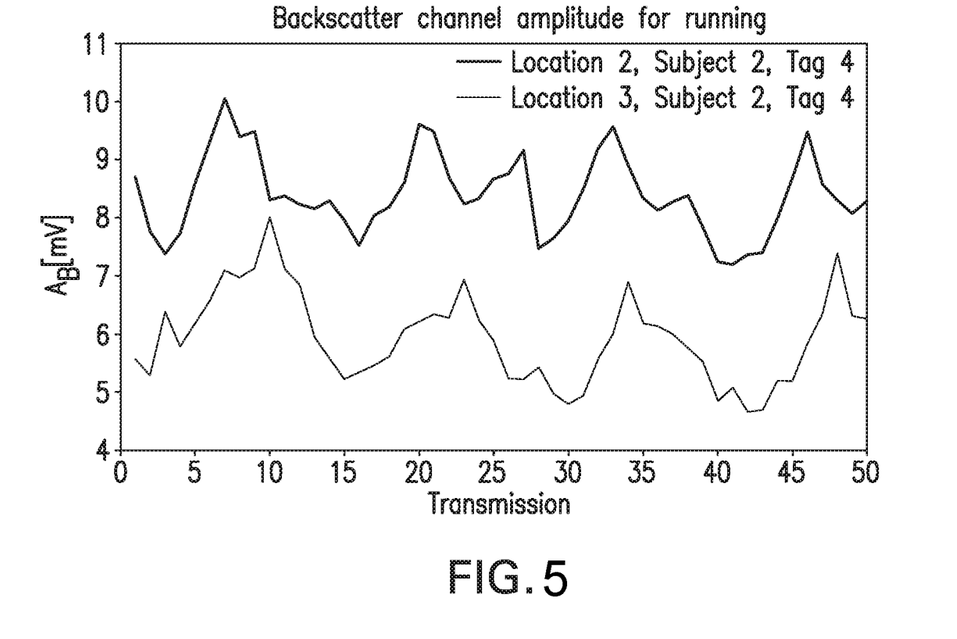
FIG. 5 is a graph of backscatter amplitude for running as an activity in accordance with an embodiment of the present disclosure.
Figure 6:
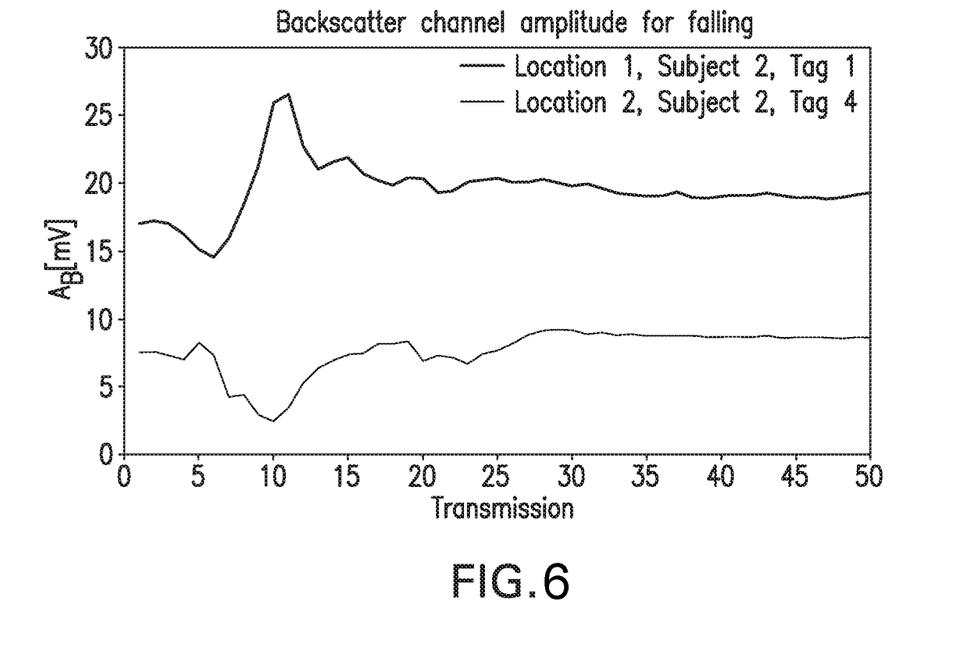
FIG. 6 is a graph of backscatter amplitude for falling as an activity in accordance with an embodiment of the present disclosure.
Figure 7:
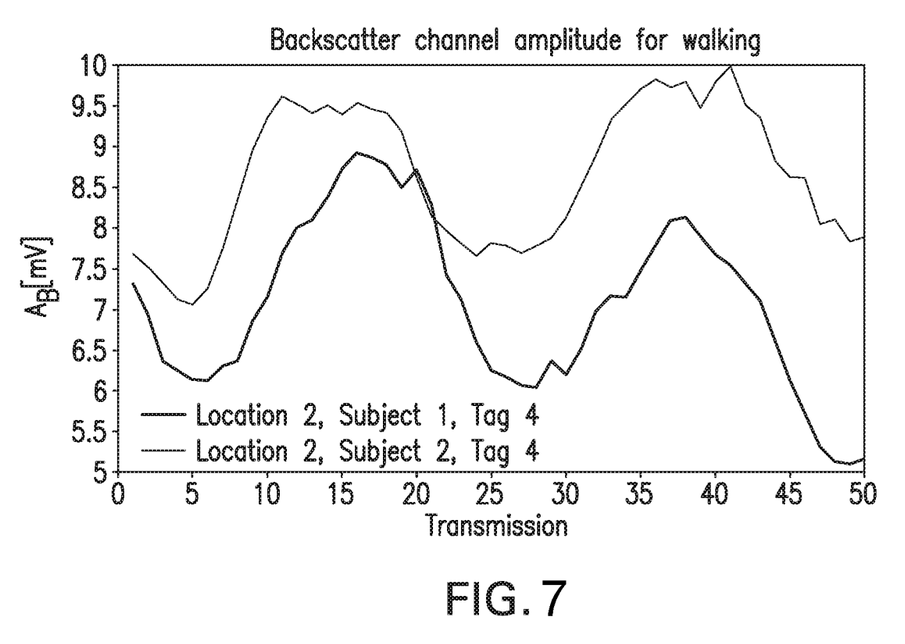
FIG. 7 is a graph of backscatter amplitude for walking as an activity in accordance with an embodiment of the present disclosure.

FIG. 5 is a graph of backscatter amplitude for running as an activity. FIG. 6 is a graph of backscatter amplitude for falling as an activity. FIG. 7 is a graph of backscatter amplitude for walking as an activity. To demonstrate invariance with regard to location, the dynamics of $A_B$ from two BCSI vectors is shown.

In FIG. 5, the two BCSI vectors were obtained from Rx tag 640d, corresponding to a human subject performing the activity of running at two different locations, at location 650b and location 650c, respectively. The similarity of the waveforms captured by the Rx tags at the two different locations are clearly very similar.

Invariance with regard to changes in the deployment environment was shown by adopting BCSI vectors from two different Rx tags, 640a and tag 640d, that correspond to the same subject that performed the activity of falling at two different locations, respectively. The dynamic patterns of the channel amplitude are shown in FIG. 6. Again, the similarity of the patterns is apparent.

Invariance with regard to a human subject or movable object is demonstrated in FIG. 7, regarding an activity of walking performed at the same location. A comparison of the amplitude from two BCSI vectors obtained from a same Rx tag, one for subject 1 and the other for subject 2. As shown in FIG. 7, the two waveforms are very similar Walking is an activity similar to running, albeit at a slower pace, and comparison of FIG. 5, where the illustrating running as the activity, and FIG. 7, shows waveforms of similar amplitude.

Accordingly, a method for estimating characteristics of a wireless communication channel between at least two passive backscattering RF tags, i.e., nodes, is provided that includes measuring BCSI during communication between the at least two passive RF nodes using the wireless communication channel; aggregating, by at least one RF node of the at least two passive RF nodes, the measured BCSI; and analyzing, by the at least one RF node, the aggregated BSCI to detect at least one activity of a plurality of activities.

The BCSI is a feature vector $h(t)=[\Theta_{BC}\ A_B\ \Delta A_E]$, with $\Theta_{BC}$, $A_B$, and $\Delta A_E$ being a backscatter channel phase, a backscatter amplitude, and a change in excitation amplitude between sampling intervals, respectively. The backscatter channel phase is $\Theta_{BC}(t)=\Theta_B(t)-\Theta_E(t)$, with $\Theta_B$ and $\Theta_E$ being phases of an exciter transmitter to receiver channel, and the modulator of a transmitter tag varies a phase $\phi$ to obtain amplitude and phase of a backscatter signal according to Equation (5), above.

In response to detecting an activity of the plurality of activities, a transmit (Tx) node of the plurality of nodes transmits a multi-phase probing (MPP) backscatter signal for a plurality of cycles. A receiving (Rx) node of the plurality of nodes receives the MPP backscatter signal, and a BCSI vector is computed based on the received MPP backscatter signal. Also, components of the computed BCSI vector are parsed, dynamic variation patterns of the parsed components of the BCSI vector are identified, and a signature of an event based on the identified dynamic variation patterns is detected, with the detected signature of the event being invariant of an environment of the at least two passive RF nodes.

Provided are a passive RF node that includes a transmitter and at least one processor configured to measure backscatter channel state information (BCSI) during wireless communication with at least one other passive RF node, aggregate the measured BCSI, and analyze the aggregated BSCI to detect at least one activity of a plurality of activities. The BCSI is a feature vector comprising a backscatter channel phase, a backscatter amplitude, and a change in excitation amplitude between sampling intervals. The backscatter channel phase is a difference between phases of an exciter transmitter and phases of a receiver channel. In the passive RF node, a modulator of the transmitter varies a phase $\phi$ to obtain amplitude and phase of a backscatter signal according to Equation (5), above.

In response to detecting an activity of the plurality of activities, the at least one processor transmits a MPP backscatter signal for a plurality of cycles and the at least one other RF node of the plurality of nodes receives the MPP backscatter signal, and a BCSI vector is computed based on the received MPP backscatter signal. Also, the at least one processor parses components of the computed BCSI vector, identifies dynamic variation patterns of the parsed components of the BCSI vector, and detect a signature of an event based on the identified dynamic variation patterns. The detected signature of the event is invariant of an environment of the at least two passive RF nodes and a rate of the aggregating of the measured BCSI is based on a predefined energy budget that limits a backscatter data rate and a number of discrete reflection phases.

While the present disclosure has been shown and described with reference to certain aspects thereof, it will be understood by those skilled in the art that various changes in form and details may be made therein without departing from the spirit and scope of the present disclosure, as defined by the appended claims and equivalents thereof.

REFERENCES

[1] V. Liu, A. Parks, V. Talla, S. Gollakota, D. Wetherall, and J. R. Smith, "Ambient backscatter: wireless communication out of thin air," ACM SIGCOMM Computer Communication Review, vol. 43, no. 4. ACM, 2013, pp. 39-50.

[2] B. Kellogg, A. Parks, S. Gollakota, J. R. Smith, and D. Wetherall, "Wifi backscatter: Internet connectivity for rf-powered devices," ACM SIGCOMM Computer Communication Review, vol. 44, no. 4. ACM, 2014, pp. 607-618.

[3] A. N. Parks, A. Liu, S. Gollakota, and J. R. Smith, "Turbocharging ambient backscatter communication," ACM SIG-COMM Computer Communication Review, vol. 44, no. 4, pp. 619-630, 2015.

[4] P. V. Nikitin, S. Ramamurthy, R. Martinez, and K. Rao, "Passive tag-to-tag communication," in RFID (RFID), 2012 IEEE International Conference on. IEEE, pp. 177-184, 2012.

[5] G. Marrocco and S. Caizzone, "Electromagnetic models for passive tag-to-tag communications," IEEE Transactions on Antennas and Propagation, vol. 60, no. 11, pp. 5381-5389, 2012.

[6] C. Liu and Z. J. Haas, "Multi-hop routing protocols for rfid systems with tag-to-tag communication," in Military Communications Conference (MILCOM), MILCOM 2017-2017 IEEE. IEEE, pp. 563-568, 2017.

[7] Y. Karimi, A. Athalye, S. R. Das, P. M. Djuric, and M. Stanacevic, "Design of a backscatter-based tag-to-tag system," in RFID (RFID), 2017 IEEE International Conference on. IEEE, pp. 6-12, 2017.

[8] A. Athalye, J. Jian, Y. Karimi, S. R. Das, and P. M. Djuric, "Analog front end design for tags in backscatter-based tag-to-tag communication networks," in Circuits and Systems (IS-CAS), 2016 IEEE International Symposium on. IEEE, pp. 2054-2057, 2016.

[9] M. Dowling, M. F. Bugallo, S. Das, and P. M. Djuric, "Tracking of objects in a passive backscattering tag-to-tag network," in 2018 IEEE 19th International Workshop on Signal Processing Advances in Wireless Communications (SPAWC). IEEE, pp. 1-5, 2018.

[10] J. Ryoo, Y. Karimi, A. Athalye, M. Stanacevic, S. Das, and P. Djuric, "Barnet: Towards activity recognition using passive backscattering tag-to-tag network," in Proceedings of the 16th Annual International Conference on Mobile Systems, Applications, and Services. ACM, pp. 414-427, 2018.

[11] K. Finkenzeller, RFID Handbook: Fundamentals and Applications in Contactless Smart Cards and Identification. New York, N.Y., USA: John Wiley & Sons, Inc., 2003.

[12] J. Grifin and G. Durgin, "Complete link budgets for backscatter-radio and rfid systems," IEEE Trans. on Antennas and Propagation Magazine, vol. 51, no. 2, pp. 11-25, 2009.

[13] C. Boyer and S. Roy, "Backscatter communication and rfid: Coding, energy, and mimo analysis," IEEE Transactions on Communications, vol. 62, no. 3, pp. 770-785, 2014.

[14] P. N. Alevizos and A. Bletsas, "Industrial swift: Backscatter radio and rfids," Wireless Information and Power Transfer: Theory and Practice, pp. 61-79, 2018.

[15] C.-Y. Yao and W.-C. Hsia, "An indoor positioning system based on the dual-channel passive rid technology," IEEE Sensors Journal, vol. 18, no. 11, pp. 4654-1663, 2018.

[16] F. Adib, Z. Kabelac, and D. Katabi, "Multi-person localization via rf body reflections." in NSDI, pp. 279-292, 2015.

[17] H. Li, C. Ye, and A. P. Sample, "IDSense: A human object interaction detection system based on passive UHF RFID," in Proceedings of the 33rd Annual ACM Conference on Human Factors in Computing Systems, pp. 2555-2564, 2015.

[18] S. Sigg, U. Blanke, and G. Troster, "The telepathic phone: Frictionless activity recognition from wifi-rssi," in Pervasive Computing and Communications (Per Com), 2014 IEEE International Conference on. IEEE, pp. 148-155, 2014.

[19] "Bladed: the usb 3.0 superspeed software defined radio." [Online]. Available: http://nuand.com/

[20] "Bladerf usb 3.0 superspeed software defined radio source code." [Online] Available: https://nuand.com/forums/

[21] "902-928 Mhz 9 dbic circular polarity panel." [Online] Available: http://www.lairdtech.com/products/s9028pcl-s9028per

What is claimed is:

1. A method for estimating characteristics of a wireless communication channel between at least two passive backscattering radio frequency (RF) nodes, the method comprising:
measuring backscatter channel state information (BCSI) during communication between the at least two passive RF nodes using a multi-phase probing (MPP) signal;
aggregating, by at least one RF node of the at least two passive RF nodes, the measured BCSI; and
analyzing, by the at least one RF node, the aggregated BSCI to at least one of detect at least one activity of a plurality of activities, improve a rate of data communication, improve robustness, and reduce bit error rate.

2. The method of claim 1,
wherein the BCSI is a feature vector h(t)=[$\Theta_{BC}$ $A_B$ $\Delta A_E$], with $\Theta_{BC}$, $A_B$, and $\Delta A_E$ being a backscatter channel phase, a backscatter amplitude, and a change in excitation amplitude between sampling intervals, respectively.

3. The method of claim 2,
wherein the backscatter channel phase is $\Theta_{BC}(t)=\Theta_B(t)-\Theta_E(t)$, and
wherein $\Theta_B$ and $\Theta_E$ are phases of an exciter-transmitter-receiver channel and an exciter-transmitter channel, respectively.

4. The method of claim 3,
wherein a backscatter modulator of a transmitter tag varies a backscatter signal phase $\phi$ to obtain amplitude and a phase of a backscatter signal at a receiver tag according to:

$$\theta_{BC} = \frac{\pi}{2} - \phi|_{\Delta v_R=0},$$

$$A_B = \Delta v_R|_{\phi=-\theta_{BC}}.$$

5. The method of claim 1,
wherein, in response to detecting an activity of the plurality of activities, a transmit (Tx) node of the plurality of nodes transmits the MPP signal for a plurality of cycles, and
wherein the MPP signal comprises a packet of data symbols, with a backscatter channel phase of the symbols within the packet being systematically varied.

6. The method of claim 5,
wherein a receiving (Rx) node of the plurality of nodes receives the MPP signal, and a BCSI vector is computed based on the received MPP signal.

7. The method of claim 6, further comprising:
parsing components of the computed BCSI vector;
identifying dynamic variation patterns of the parsed components of the BCSI vector; and
detecting a signature of an event based on the identified dynamic variation patterns.

8. The method of claim 7,
wherein the detected signature of the event is invariant of an environment of the at least two passive RF nodes.

9. The method of claim 1,
wherein the communication between the at least two passive RF nodes is powered by electromagnetic energy harvested by at least one of the at least two passive RF nodes.

10. The method of claim 9,
wherein a rate of the aggregating is based on an energy budget of a receiving (Rx) node of the plurality of nodes.

11. The method of claim 10,
wherein the energy budget limits a backscatter data rate and a number of discrete reflection phases.

12. A passive radio frequency (RF) node, comprising:
a backscatter modulator; and
at least one processor configured to:
  measure backscatter channel state information (BCSI) during communication with at least one other passive RF node,
  aggregate the measured BCSI, and
  analyze the aggregated BSCI to at least one of detect at least one activity of a plurality of activities, improve a rate of data communication, improve robustness, and reduce bit error rate.

13. The passive RF node of claim 12,
wherein the BCSI is a feature vector comprising a backscatter channel phase $\Theta_{BC}$, a backscatter amplitude $A_B$, and a change in excitation amplitude $\Delta A_E$ between sampling intervals.

14. The passive RF node of claim 13,
wherein the backscatter channel phase $\Theta_{BC}(t)$ is a difference between phases of an exciter transmitter $\Theta_B(t)$ and phases of a receiver channel $\Theta_E(t)$.

15. The passive RF node of claim 14,
wherein a backscatter modulator varies a backscatter signal phase $\phi$ to obtain amplitude and phase of a backscatter signal at the receiver according to:

$$\theta_{BC} = \frac{\pi}{2} - \phi|_{\Delta v_R = 0},$$

$$A_B = \Delta v_R|_{\phi = -\theta_{BC}}.$$

16. The passive RF node of claim 12,
wherein, in response to detecting an activity of the plurality of activities, the at least one processor is further configured to transmit a multi-phase probing (MPP) signal for a plurality of cycles.

17. The passive RF node of claim 16,
wherein the at least one other RF node of the plurality of nodes receives the MPP signal, and a BCSI vector is computed based on the received MPP signal.

18. The passive RF node of claim 17,
wherein the at least one processor is further configured to:
parse components of the computed BCSI vector;
identify dynamic variation patterns of the parsed components of the BCSI vector; and
detect a signature of an event based on the identified dynamic variation patterns.

19. The passive RF node of claim 18,
wherein the detected signature of the event is invariant of an environment of the at least two passive RF nodes.

20. The passive RF node of claim 1,
wherein a rate of the aggregating of the measured BCSI is based on a predefined energy budget that limits a backscatter data rate and a number of discrete reflection phases.

* * * * *